(12) United States Patent
Cattaruzzi

(10) Patent No.: US 6,341,687 B1
(45) Date of Patent: Jan. 29, 2002

(54) EQUIPMENT FOR MOVING CAGES USED FOR HOLDING AND TRANSPORTING CHICKENS, HENS AND SIMILAR

(75) Inventor: Bruno Cattaruzzi, Brescia (IT)

(73) Assignee: Cattaruzzi International S.r.l. (IT)

( * ) Notice: Subject to any disclaimer, the term of this patent is extended or adjusted under 35 U.S.C. 154(b) by 0 days.

(21) Appl. No.: 09/417,675

(22) Filed: Oct. 14, 1999

(30) Foreign Application Priority Data

May 7, 1999 (IT) ............................... BS99 U 0038

(51) Int. Cl.[7] ............................................ B65G 47/46
(52) U.S. Cl. ............................. 198/802; 198/476.1
(58) Field of Search ............................. 198/802, 476.1, 198/813

(56) References Cited

U.S. PATENT DOCUMENTS

| | | | | |
|---|---|---|---|---|
| 4,089,404 A | * | 5/1978 | Venzke ...................... | 198/802 |
| 4,722,430 A | * | 2/1988 | Canziani ................... | 198/802 |
| 4,798,277 A | * | 1/1989 | Dubuit et al. ............ | 198/476.1 |
| 5,181,597 A | * | 1/1993 | Geerts ..................... | 198/802 |
| 5,353,912 A | * | 10/1994 | Killer et al. ............ | 198/802 |

\* cited by examiner

*Primary Examiner*—Douglas Hess
(74) *Attorney, Agent, or Firm*—McGlew and Tuttle, P.C.

(57) ABSTRACT

A transportation arrangement includes a closed track with a chain running along the closed track. A plurality of base frames are arranged on the chain and move along the track by the chain which is powered by a motor. A plurality of counter frames are each pivotally connected to a pivot edge of one of the base frames where the pivot edge of the base frames is arranged at a radially inside edge of the base frames with respect to the closed track. A lifting station is arranged at the closed track, with the chains moving the base frames into and away from the lifting station. A lifting jack in the lifting station raises a lifting edge of the counter frames located at the lifting station. The lifting jack pivots the counter frame about the pivot edge of the base frame. The base frames are attached to a portion of the chain, and are rotatable with respect to the portion of the chain to which the respective base frames are attached.

18 Claims, 2 Drawing Sheets

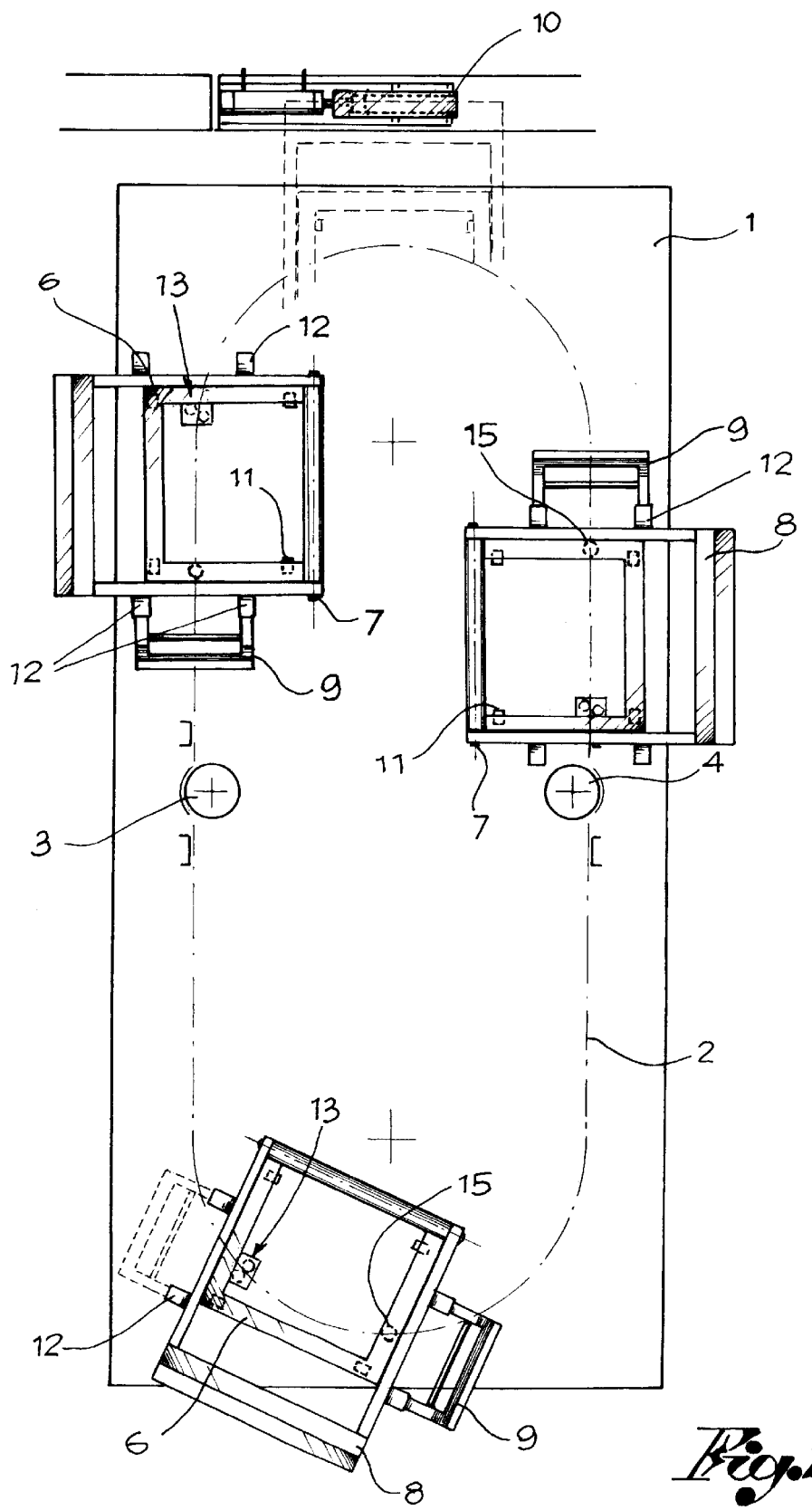

EQUIPMENT FOR MOVING CAGES USED FOR HOLDING AND TRANSPORTING CHICKENS, HENS AND SIMILAR

FIELD OF THE INVENTION

The model in question concerns equipment suitable for large boxes, in this case, intended for use in chicken farms and, in particular, to move the large cages holding the animals during loading, unloading and transportation.

BACKGROUND OF THE INVENTION

Similar equipment is already in use, where the cages are accommodated during the first phase of loading, before being transferred by means of the appropriate devices, which essentially consist of thrust-blocks, each operated by a motor; these thrust-blocks then being transferred, by other motorised means, onto the carrying structure of said equipment.

However, these solutions, apart from being particularly complicated and expensive, are of limited use in those poultry farms with low ceilings, where the use of moving equipment may be awkward or unsafe. Another important problem connected with the above-mentioned equipment concerns the centrifugal force to which the cages are subjected during the simultaneous movements of transfer and rotation, which brings risks of instability for the whole structure and, therefore, a source of danger to the operators.

Finally, those structures already existing do not exploit the work cycles in a rational way, leaving downtime between the various phases of loading, unloading and picking up of the cages.

SUMMARY AND OBJECT OF THE INVENTION

The main aim of the equipment in question is to avoid such inconveniences by adopting new and different components, without altering the functionality and use of the equipment itself.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 shows a plan of the whole equipment;

DESCRIPTION OF THE PREFERRED EMBODIMENT

Figure 3:
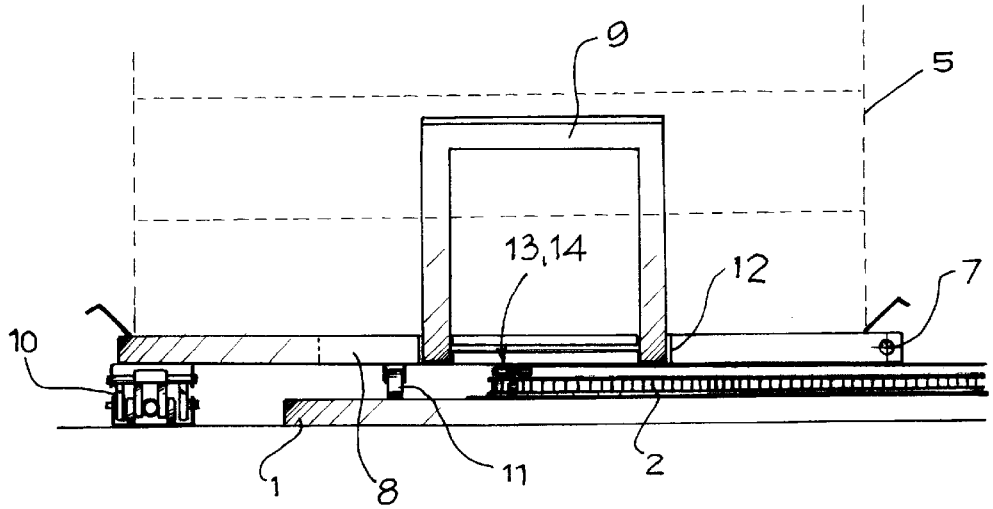
FIG. 3 is a schematic drawing of a cage with the means of transfer.
Figure 4:
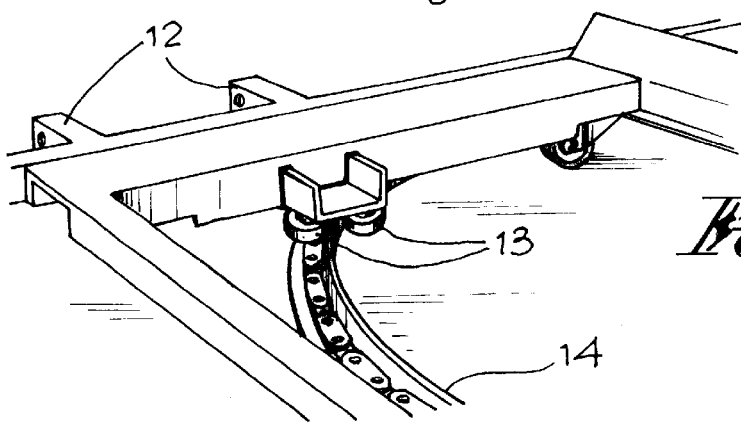
FIG. 4 shows a close-up of the means for guiding the cages.
Figure 2:
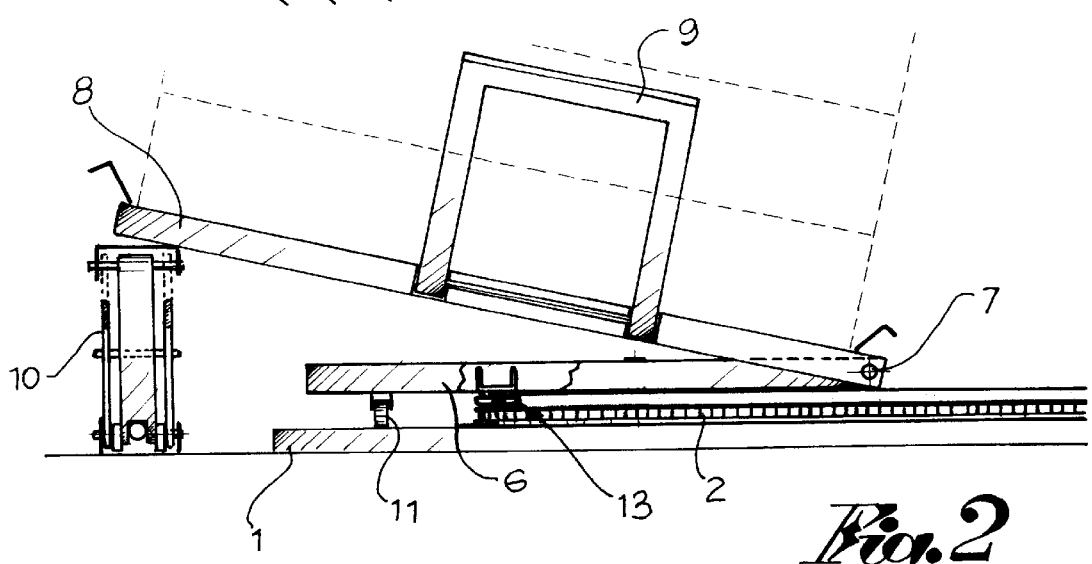
FIG. 2 represents a cage during the loading phase.

In these drawings, number 1 represents the deck plane forming the base of the whole equipment. Upon this, a chain 2 is mounted, said chain being operated by a motor 3 (not illustrated) and kept under tension by a chain-stretcher 4.

Onto said chain 2, there are fastened in 15 three base frames 6, to which at pivot edge 7, there are hinged counter-frames 8, which are free to pivot horizontally and on which the cages 5 are placed.

Furthermore, the counter-frames 8 are equipped with checks 9 against which the cages 5 come to rest, said checks 9 may also be inserted in the two slots 12 on the opposite side of the counter-frame 8.

Such a disposition means that the position of the cages 5 may be reversed according to their loading direction on the counter-frames 8.

Furthermore, a couple of bearings 13 are also fixed to the counter-frames 8, to guide the latter along the guide rail 14 of the chain 2, in such a way as to create two constraints for the said counter-frames, namely the fastening device 15 and the bearings 13.

In addition, the base frames 6 are positioned on the chain 2 in such a way that their centers of rotation and transfer are sufficiently far apart to divide the chain 2 into three parts of equal length, thereby keeping the cages 5 at an equal distance from one another.

In the front part of the plane 1, and external to it, there is a hydraulic jack in parallelogram 10, which is already known, and which is used to hold up the counter-frame 8 and, consequently, the cage 5, during the loading phase, so that the animals can be put inside more easily and, once lowered, the cage can be moved with its full load. The frames 6 are also equipped with support wheels 11 to help them run along the plane 1.

With the structure set up in this way, that is, without the motorised thrust-blocks for support and rotation of the cages with their animal loads, it is ideal for managing simultaneously the phases of loading the animals in the cages, picking up the full cage and at the same time loading the other empty cage. It can ensure that the vehicles responsible for moving the cages will always position them identically in front of the operator, irrespectively of the position, left or right, of the loading door on the cage and the rotating direction of the chain, as well as placing the cages 5 with their respective animal-loading doors in the same position during the phases of picking up an empty cage and loading an empty one.

More specifically, the length of the chain 2, which is divided into three equal parts, means that the cages 5 can always be presented in the same position as during the phases of filling an empty cage, picking up a full cage and loading an empty cage for the next load, irrespectively of the direction, clockwise or anti-clockwise, of the chain 2.

The above description makes clear how one of the other aims has been achieved, namely that of reducing the height from the ground of the plane 1 and, thereby, of the cages with respect to the poultry farm where the structure is being employed. Likewise, the rotatory movement of the cages around their own axes has been eliminated, significantly reducing the centrifugal force to which said cages are subjected.

What is claimed is:

1. Transportation equipment comprising:
    a deck plane forming a base;
    a closed track on said deck plane;
    a chain running along said closed track;
    a plurality of base frames arranged on said chain and movable along said track by said chain;
    a plurality of counter frames each pivotally connected to a pivot edge of one of said base frames, said pivot edge of said base frames being arranged at a radially inside edge of said base frames with respect to said closed track;
    fastening elements on said counter frames for fastening animal cages in a plurality of positions to said counter frames;

said closed track has a longitudinal side and curved ends;

a filling phase station is arranged at said deck plane at one of said curved ends of said closed track for filling the cages on said counter frames;

a loading phase station is arranged at said deck plane at said longitudinal side of said closed track for transferring the cages, said plurality of base and counter frames are limited to three frames equally spaced apart on said chain with two of said frames being movable simultaneous into said stations;

said deck plane being movable and transportable.

2. Transportation equipment in accordance with claim 1, further comprising:

a lifting station arranged at said closed track, said chain moving said base frames into and away from said lifting station, said lifting station including a lifting jack for raising a lifting edge of said counter frames at said lifting station and pivoting said counter frame about said pivot edge of said base frame independent of said chain.

3. Transportation equipment in accordance with claim 2, wherein:

said lifting jack is spaced from said closed track;

said lifting edge of said counter frame is on a side of said counter frames diametrically opposite said pivot edge.

4. Transportation equipment in accordance with claim 3, wherein:

said base frames are pivotally attached to a portion of said chain, said base frames being rotatable with respect to said portion of said chain to which respective said base frames are attached;

said base frames are rotatable with respect to said portion of said chain about an axis perpendicular to a plane of said closed track.

5. Transportation equipment in accordance with claim 1, wherein:

said base frames are pivotally attached to a portion of said chain, said base frames being rotatable with respect to said portion of said chain to which respective base frames are attached.

6. Transportation equipment in accordance with claim 5, wherein:

said base frames are rotatable with respect to said portion of said chain about an axis perpendicular to a plane of said closed track, said base frames include swivelling wheels spaced from said chain and said track for supporting said base and counter frames on said deck plane.

7. Transportation equipment in accordance with claim 5, further comprising:

a bearing arranged on each of said base frames and spaced from said portion of said chain, said bearing guiding said base frames on said closed track.

8. Transportation equipment comprising:

a deck plane forming a base;

a closed track on said deck plane;

a chain running along said closed track;

a plurality of base frames arranged on said chain and movable along said track by said chain;

a plurality of counter frames each pivotally connected to a pivot edge of one of said base frames;

a lifting station arranged at said closed track, said chain moving said base frames into and away from said lifting station, said lifting station including a lifting jack for raising a lifting edge of said counter frame at said lifting station and pivoting said counter frame about said pivot edge of said base frame independent of said chain;

fastening elements on said counter frames for fastening animal cages in a plurality of positions to said counter frames;

said closed track has a longitudinal side and curved ends;

a filling phase station is arranged at said deck plane at one of said curved ends of said closed track for filling the cages on said counter frames;

a loading phase station is arranged at said deck plane at said longitudinal side of said closed track for transferring the cages, said plurality of base and counter frames are limited to three frames equally spaced apart on said chain with two of said frames being movable simultaneous into said stations;

said deck plane being movable and transportable.

9. Transportation equipment in accordance with claim 8, wherein:

said lifting jack is spaced from said closed track;

said lifting edge of said counter frame being on a side of said counter frames diametrically opposite said pivot edge.

10. Transportation equipment in accordance with claim 8, wherein:

said lifting jack is hydraulic and only raises said counter frame when said chain has stopped moving said counter frame around said track.

11. Transportation equipment in accordance with claim 8, wherein:

said pivot edge of said base frames are arranged at a radially inside edge of said base frames with respect to said closed track.

12. Transportation equipment in accordance with claim 8, wherein:

said base frames are pivotally attached to a portion of said chain, said base frames being rotatable with respect to said portion of said chain.

13. Transportation equipment in accordance with claim 12, wherein:

said base frames are rotatable with respect to said portion of said chain about an axis perpendicular to a plane of said closed track.

14. Transportation equipment comprising:

a deck plane forming a base;

a closed track on said deck plane;

a chain running along said closed track;

a plurality of base frames pivotally attached to a portion of said chain and movable along said track by said chain, each said base frames being rotatable with respect to said portion of said chain to which respective base frames are attached;

a plurality of counter frames each pivotally connected to a pivot edge of one of said base frames;

fastening elements on said counter frames for fastening animal cages in a plurality of positions to said counter frames;

said closed track has a longitudinal side and curved ends;

a filling phase station is arranged at said deck plane at one of said curved ends of said closed track for filling the cages on said counter frames;

a loading phase station is arranged at said deck plane at said longitudinal side of said closed track for transferring the cages, said plurality of base and counter frames are limited to three frames equally spaced apart on said chain with two of said frames being movable simultaneous into said stations;

said deck plane being movable and transportable.

15. Transportation equipment in accordance with claim 14, wherein:

said base frames are rotatable with respect to said portion of said chain about an axis perpendicular to a plane of said closed track.

16. Transportation equipment in accordance with claim 14, wherein:

said pivot edge of said base frames are arranged at a radially inside edge of said base frames with respect to said closed track.

17. Transportation equipment in accordance with claim 14, further comprising:

a lifting station arranged at said closed track, said chain moving said base frames into and away from said lifting station, said lifting station including a lifting jack for raising a lifting edge of said counter frame at said lifting station and pivoting said counter frame about said pivot edge of said base frame independent of said chain.

18. Transportation equipment in accordance with claim 17, wherein:

said lifting jack is spaced from said closed track;

said lifting edge of said counter frame is on a side of said counter frames diametrically opposite said pivot edge.

* * * * *